Oct. 21, 1969 R. RINESCH ET AL 3,473,968
DEVICE FOR CONTINUOUSLY MEASURING THE TEMPERATURE OF HOT MEDIA
Filed April 5, 1966 2 Sheets-Sheet 1

INVENTORS:
RUDOLF RINESCH
GEROLF STROHMEIER
BY
Burlaugh, Free, Graves & Donohue
THEIR ATTORNEYS

INVENTORS:
RUDOLF RINESCH
GEROLF STROHMEIER
BY

THEIR ATTORNEYS

United States Patent Office 3,473,968
Patented Oct. 21, 1969

3,473,968
DEVICE FOR CONTINUOUSLY MEASURING THE TEMPERATURE OF HOT MEDIA
Rudolf Rinesch, Linz, and Gerolf Strohmeier, Reutte, Tyrol, Austria, assignors to Vereinigte Osterreichische Eisen- und Stahlwerke Aktiengesellschaft, Linz, and Metallwerk Plansee Aktiengesellschaft, Reutte, Tyrol, Austria, Austrian companies
Filed Apr. 5, 1966, Ser. No. 540,320
Claims priority, application Austria, Apr. 12, 1965, A 3,340/65
Int. Cl. H01v 1/04
U.S. Cl. 136—230                                    4 Claims

ABSTRACT OF THE DISCLOSURE

Continuous temperature measuring apparatus for steelmaking converters is described. The wall of the reaction vessel is penetrated by a tube of a material that is heat-proof and resistant to the influence of the melt, slag and lining materials. The tube is sealed at its inner end, substantially even with the inner wall of the converter, by a replaceable plug of a metal-ceramic material which is also heat-proof and resistant to the materials in the converter, and which has the further property of good thermal conductivity. A thermocouple is mounted within the tube in direct thermal contact with the metal-ceramic closure plug. Various types of thermocouple arrangements are shown.

---

Figure 1:
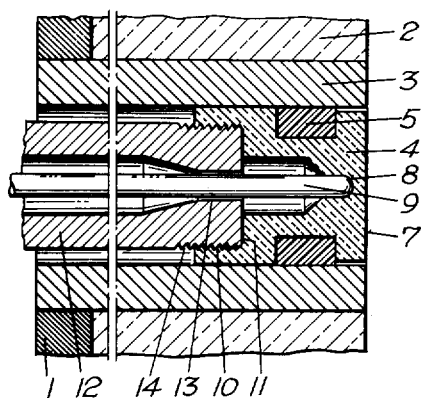

This invention relates to a device for continuously measuring the temperature of hot media in reaction vessels or the like.

Continuous temperature measuring is of great importance in all processes involving heat generation because the temperature values measured during a process may be regarded as an indication of the progress of the respective process and, in the sequel, may serve for an automatic control of the process. A device for continuously measuring the temperature thus is of particular value in carrying out metallurgical processes in which carbon-containing ferrous melts are refined with oxygen in converters or crucibles. There, a reliable temperature recording may give an accurate information on the progress of the combustion of the individual impurities, and the termination of the refining reaction and the attainment of the optimal tapping temperature may be safely determined, without subjective estimations, which require a good deal of experience, being necessary.

Similar tasks exist in the operation of atomic reactors where fluid aluminium is used as a cooling agent, and in other technical fields.

Devices for continuously measuring the temperature in refining processes are already known which comprise a sensing head adapted to be inserted into a tubular cut-out of the brickwork of the converter and including a protective tube of refractory ceramic material enclosing a thermocouple and projecting into the melt, the branches of the thermocouple extending through the brickwork and the shell of the vessel to the outside. For the attachment of the protective tube a rather complicated supporting structure is provided and means are required for preventing sintering of the measuring device in the sensing region. To this end, e.g. pressurized gas is blown into the annular gap between the supporting body holding the protective tube with the thermocouple and its seat in the refractory brickwork.

Disadvantages of the known device reside in that the material of the protective tube proved deficient in resistance to the influences of melt, slag and lining materials. The materials which have been proposed for the protective tube include various substances, such as chromite, sintered magnesia and zirconium diboride, but any attempts to attain a durability lasting for more than about 10 heats have not been successful. Mostly, the known devices hardly withstand one heat.

The main drawback of the known device has been, however, that it appeared to be inevitable to have the protective tube with the thermocouple projecting freely into the converter, as the thermal conductivity of the materials hitherto employed was insufficient; retracting the thermocouple into the interior of (in alignment with) the refractory lining seemed to be impossible because the poor thermal conductivity of the materials used would have resulted in a lag of the temperature indication. On the other hand, the arrangement of the measuring device to project into the interior of the converter has shown to be extremely inconvenient and disturbing, as damages to the measuring device during the charging of the converter with scrap, pigs or the like frequently occurred.

It is an object of the invention to avoid these difficulties by providing a device for continuously measuring the temperature of hot media in reaction vessels or the like, in particular of iron and steel melts in a refractory-lined metallurgical furnace, which comprises a tube penetrating the wall of the vessel and enclosing a thermocouple, said tube being made of a material which is heat-proof and resistant to the influences of the hot medium. The device is characterized in that the tube is closed substantially level with the inner wall of the vessel by a closing member consisting of a material which is also heat-proof and resistant to the influences of the medium and which has a good thermal conductivity, preferably of a metal ceramic material, and that the thermocouple is arranged in, on or behind the closing member.

It is thus an essential feature of the invention that the material used for the closing member is not only resistant to heat and to the influences of melt, slag and lining materials, but also has a good thermal conductivity. This allows to arrange the measuring point on the inner wall of the refractory lining (in alignment therewith) or even farther back so that no projecting parts of the measuring device will protrude into the interior of the metallurgical furnace, whereby any risk of injuries during charging is eliminated.

A material which has proved suitable for the purposes of the invention for the closing member and eventually also for the tube penetrating the wall of the vessel is a metal-ceramic material composed of finely divided metallic and oxidic components, 20 to 85% by volume, preferably 40 to 75% by volume, consisting of metallic constituents predominantly comprising molybdenum and/or tungsten, and 15 to 80% by volume, preferably 25 to 60% by volume, consisting of oxidic constituents predominantly comprising zirconium oxide.

Beside the metallic molybdenum and/or tungsten, also chromium may be present in an amount of up to about 50% by weight of the metallic constituents.

The oxide-ceramic component may contain additions which stabilize the zirconium oxide phase, e.g. additions of calcium or magnesium oxide in an amount of up to 10% by weight of the total amount of oxide-ceramic constituents.

In a preferred embodiment, the oxide-ceramic component contains additions of thorium oxide, hafnium oxide and/or titanium oxide, amounting up to 50% by weight of the total amount of the oxide-ceramic phase.

Preferably, the closing member is detachably mounted, e.g. by a frictional fit, in that end of the tube penetrating the lining which terminates in alignment with the inner wall of the vessel, so that it can be punched out of the tube end into the interior of the converter and replaced by a new closing member, when it has been subjected to a predetermined wear.

With respect to the use of a closing member made of metal ceramic material, the invention comprises three preferred embodiments which reside in that (a) The hot-soldering joint of the thermocouple forms a unity with the closing member, the closing member being, e.g., pressed in or sintered in;

(b) That the two branches of the thermocouple form a unity with the closing member by being, e.g., sintered in or pressed in, the material of the one thermocouple branch being the same as the main metal constituent of the metal-ceramic material of the closing member so that the latter forms part of the hot-soldering joint; or (c) That one of the thermocouple branches consists of a metal-ceramic tube and the other branch consists of a second conductor extending to the tip of the tube and being secured in the tip, particularly pressed in or sintered in, the closing member being either made of the same metal-ceramic material as the tube constituting the one branch of the thermocouple or of a different material.

These and further features of the invention are illustrated in more detail in the drawing which shows various exemplary embodiments. FIGS. 1 to 9 are vertical sectional views of a converter shell and its refractory lining.

In the figures, 1 is the converter wall, 2 the refractory lining, and 3 a tube penetrating the refractory lining and consisting of a material which is heat-proof and resistant to the influences of melt, slag and lining materials. The melt-side end of tube 3 is closed by a closing member 4, which, according to the invention, must not only fulfill the same requirements as tube 3 as regards resistance and heat-proofness, but should also have a good thermal conductivity, which is realized in an optimal manner with a metal-ceramic material of the composition mentioned hereinbefore. Of course, tube 3 and closing member 4 may be made of the same material.

Figure 2:
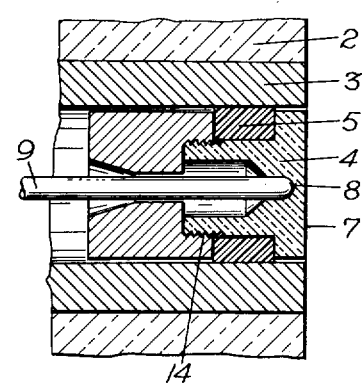
Figure 3:
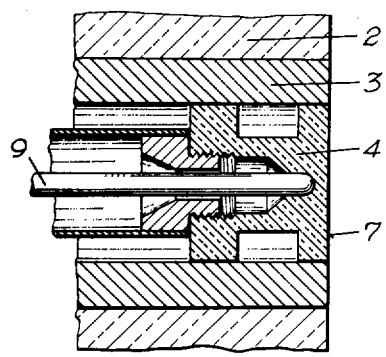
Figure 4:
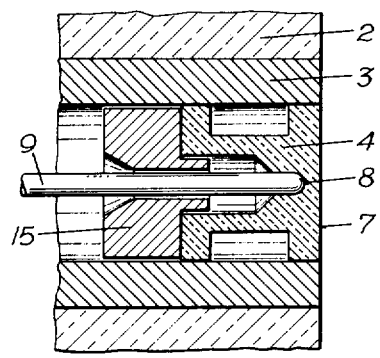

Closing member 4 may be sealed against tube 3 by a refractory sealing substance 5, as in the embodiments shown in FIGS. 1 and 2. On the other hand, when there is an almost play-free fit and a frictional contact between the closing member and the end of tube 3, as in FIGS. 3 and 4, the space provided for the annular sealing means may be left free and is filled with air. Such an air space results in an accumulation of heat and, consequently, in a very quick indication of the measuring device.

Figure 5:
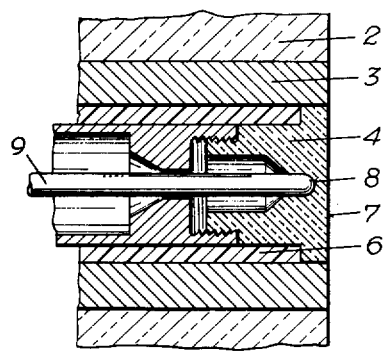
Figure 6:
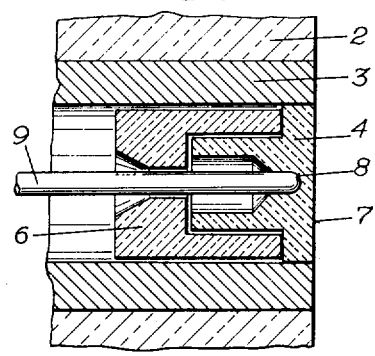

Examples of an additional insulation of the measuring device are illustrated in FIGS. 5 and 6. Numeral 6 therein denotes ceramic insulating substances.

In all of the embodiments shown in FIGS. 1 to 6 the surface 7 of the sealing member, which faces the interior of the vessel, is in alignment with the inner wall of the refractory lining 2 and with the end face of tube 3. The said surface is preferably free of metallic constituents, which may be realized by pickling this surface, so that only oxidic components will come into contact with the slag and the melt. In the embodiments shown in FIGS. 1 to 6, a trough-shaped recess 8 is provided in the central part of the closing members and serves to take up a thermo-couple which is enclosed in a conventional manner in a commercial gas-tight protective tube 9 of ceramics. The end of this thermocouple-enclosing protective tube is arranged to be engaged in the trough 8. Owing to the good thermal conductivity of the material of the closing member, the temperature indication is rapid and shows no lagging.

In all of the embodiments shown in FIGS. 1 to 6, the trough 8 of the closing member expands and, with the radially outwardly extending surfaces of the closing member, forms seat surfaces 10 and 11 for the supporting tube 12 having a centering portion 13 at its front end. Centering may be effected by means of screw threads 14 (FIGS. 1, 2, 3), by a fitting portion 15 (FIG. 4), by a bayonet fixing, or in another known manner.

Figure 7:
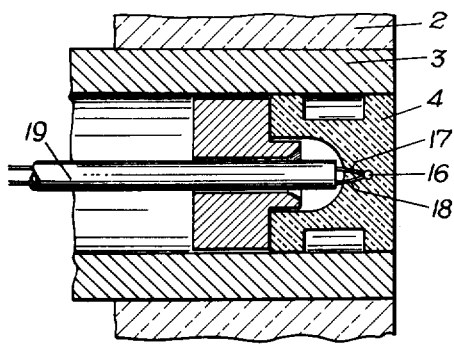

As has been mentioned, the embodiments according to FIGS. 1 to 6 use commercial thermocouples enclosed in ceramic protective tubes, e.g., of the platinum/rhodium type. Preferred embodiments of new thermocouples using metal-ceramic closing members according to the invention are illustrated in FIGS. 7, 8 and 9.

In the embodiment according to FIG. 7, numeral 4 again designates the closing member. Pressed or sintered into the interior of this closing member is the hot-soldering joint 16 of a thermocouple consisting of two branches 17, 18, the hot-soldering joint thus forming a unity with the closing member. It has to be borne in mind, however, that metals must be used for the conductors of the thermocouple which are not poisoned by the metallic constituents of the closing member made of metal-ceramic material. Tungsten/rhenium has proved to be a suitable thermocouple for this purpose. The thermocouple conductors or branches 17, 18 extending from the hot-soldering joint 16 out of the closing member are passed through a protective tube 19.

Figure 8:
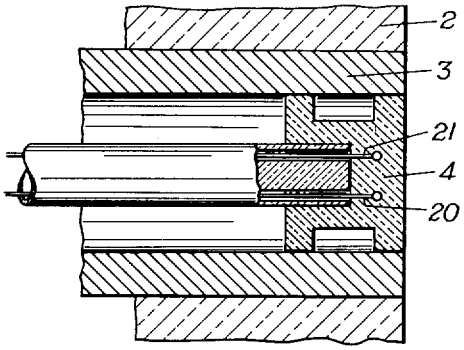

In FIG. 8 a variant is illustrated wherein the two branches 20 and 21 of the thermocouple are pressed into or sintered into the closing member 4 at a distance from each other or brought into some other metallic connection with the closing member, the material of the one thermocouple branch 20 being the same metal as the main metallic constituent of the metal-ceramic closing member, e.g., molydenum. In this way, the closing member forms part of the hot-soldering joint of the thermocouple.

Figure 9:
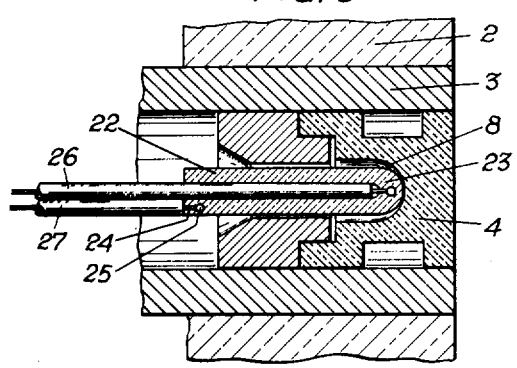

This idea as realized in another variant is illustrated in the embodiment shown in FIG. 9. The closing member is again designated by 4, and it has a trough 8 forming the seat for a thermocouple enclosed in a protective sheath to be inserted from the outside. In this embodiment the tubular protective sheath 22, which is closed at its front end, also consists of metal-ceramic material, having the one conductor 23 of a thermocouple attached to its tip particularly pressed in or sintered in. The second branch 24 of the thermocouple, which, as in the embodiment of FIG. 8, must also consist of the same material as the main metallic constituent of the metal-ceramic tube 22, is taken off at a point 25 spaced from the tip of the tube so that also in this case the metal-ceramic tube 22 forms part of the hot-soldering joint. Towards the outside, the branches 23 and 24 are again arranged in protective sheaths 26 and 27, respectively. The closing member 4 and the metal-ceramic tube 22 may, of course, be made either of the same or of different materials.

In the diagrammatic representations of FIGS. 7, 8 and 9, similar means for centering, sealing, insulating etc. are shown as in FIGS. 1 to 6.

What we claim is:

1. A device for continuously measuring the temperature of hot media in reaction vessels, comprising a tube of a material which is heat-proof and resistant to the influences of said hot medium, penetrating the wall of the vessel and enclosing a thermocouple comprising two branches and a hot-soldering joint, and a detachable closing member sealing said tube substantially level with the inner wall surface of said vessel and consisting of a metal-ceramic material which is also heatproof and resistant to the influences of the medium and which has a good thermal conductivity, both branches of said thermocouple forming a unity with said closing member by being incorporated therein, the material of one of said thermocouple branches being the same as the main metallic constituent of said metal-ceramic material of said closing member so that the latter forms part of said hot-soldering joint.

2. A device for continuously measuring the temperature of a hot medium in a reaction vessal comprising, a tube of the material which is heat-proof and resistant to the influences of said hot medium penetrating the wall of the vessel, a thermocouple comprising two branches and a hot-soldering joint enclosed by said tube, and a closing member sealing said tube substantially level with the inner wall surface of said vessel and consisting of a metal-ceramic material which is also heat-proof and resistant to the influences of the medium and which has a good thermal conductivity, said thermocouple including a metal-ceramic tube forming part of the hot-soldering joint and disposed in good thermally conductive relation to said closing member, one of said thermocouple branches being a conductor extending to and secured in the tip of said metal-ceramic tube, the other of said thermocouple branches including said metal-ceramic tube and a conductor coupled thereto at a point spaced from said tip and formed of a material which is the same as the main metallic constituent of the metal-ceramic material of said tube.

3. A device for continuously measuring the temperature of hot media in reaction vessels, comprising a tube of a material which is heat-proof and resistant to the influences of the hot medium, penetrating the wall of the vessel and enclosing a thermocouple, said tube being closed substantially level with the inner wall surface of said vessel by a detachable closing member consisting of a metal-ceramic material which is also heat-proof and resistant to the influences of the medium and which has a good thermal conductivity, said closing member being composed of 40 to 75% by volume of metallic constituents including a major proportion of molybdenum and tungsten, and 25 to 60% by volume of oxidic constituents including a major proportion of zirconium oxide.

4. A device for continuously measuring the temperature of hot media in reaction vessels, comprising a tube of a material which is heat-proof and resistant to the influences of the hot medium, penetrating the wall of the vessel and enclosing a thermocouple, said tube being closed substantially level with the inner wall surface of said vessel by a detachable closing member consisting of a metal-ceramic material which is also heat-proof and resistant to the influences of the medium and which has a good thermal conductivity, said closing member being composed of finely divided metallic and oxidic components, 20 to 85% by volume consisting of metallic constituents predominantly selected from molybdenum, tungsten and chromium, said chromium being present in an amount of up to 50% by weight of the metallic constituents, and 15 to 80% by volume consisting of oxidic constituents predominantly comprising zirconium oxide.

References Cited

UNITED STATES PATENTS

| | | | |
|---|---|---|---|
| 2,172,839 | 9/1939 | Francis et al. | 106—57 X |
| 2,245,687 | 6/1941 | Krogh | 136—242 |
| 2,843,646 | 7/1958 | Conant | 136—242 |
| 2,937,102 | 5/1960 | Wagner | 106—57 |
| 3,040,579 | 6/1962 | Taylor | 136—233 |
| 3,016,311 | 1/1962 | Stackhouse | 29—182.5 X |
| 3,115,781 | 12/1963 | Shearman | 136—233 X |
| 3,218,135 | 11/1965 | Alexander et al. | 29—182.5 |
| 3,369,877 | 2/1968 | Humenik et al. | 29—182.5 |

FOREIGN PATENTS 690,894   4/1953   Great Britain.

ALLEN B. CURTIS, Primary Examiner

U.S. Cl. X.R.

29—182.5; 106—57